(12) United States Patent
Deyerl et al.

(10) Patent No.: US 8,278,603 B2
(45) Date of Patent: Oct. 2, 2012

(54) APPARATUS FOR HEATING PLASTIC PREFORMS

(75) Inventors: Heinrich Deyerl, Teunz (DE); Arno Haner, Regensburg (DE)

(73) Assignee: Krones AG, Neutraubling (DE)

( * ) Notice: Subject to any disclaimer, the term of this patent is extended or adjusted under 35 U.S.C. 154(b) by 419 days.

(21) Appl. No.: 12/702,946

(22) Filed: Feb. 9, 2010

(65) Prior Publication Data

US 2010/0200560 A1 Aug. 12, 2010

(30) Foreign Application Priority Data

Feb. 10, 2009 (DE) .......................... 10 2009 008 318

(51) Int. Cl.
H05B 1/00 (2006.01)
(52) U.S. Cl. ...................................................... 219/385
(58) Field of Classification Search .................. 219/385
See application file for complete search history.

(56) References Cited

U.S. PATENT DOCUMENTS

| | | | |
|---|---|---|---|
| 6,361,301 B1 | 3/2002 | Scaglotti et al. | |
| 7,553,156 B2 * | 6/2009 | Doudement | 432/121 |
| 8,097,867 B2 * | 1/2012 | Bar et al. | 250/504 R |
| 2005/0274149 A1 * | 12/2005 | Hoppe et al. | 65/411 |
| 2007/0284788 A1 | 12/2007 | Kurosaki et al. | |

FOREIGN PATENT DOCUMENTS

| | | |
|---|---|---|
| DE | 42 42 812 A1 | 6/1994 |
| DE | 197 24 621 B4 | 12/1998 |
| DE | 10 2005 061 334 A1 | 6/2007 |
| EP | 1 763 428 B1 | 3/2007 |
| EP | 1 779 994 A1 | 5/2007 |
| WO | 94/01982 A1 | 1/1994 |
| WO | 2006/002751 A1 | 1/2006 |

OTHER PUBLICATIONS

German Search Report dated Oct. 1, 2010.

* cited by examiner

*Primary Examiner* — David S Blum
(74) *Attorney, Agent, or Firm* — Rissman, Hendricks & Oliverio, LLP

(57) ABSTRACT

An apparatus for heating at least one plastic preform for manufacturing containers may include a reflection body, a source of energy for emitting thermal radiation for heating the plastic preform, and a holding member for holding the plastic preform. The holding member may be moved relative to the reflection body, wherein the reflection body has a first surface allocated to the plastic preform and the source of energy is disposed in such a way that the radiation thereof reaches the reflection body. The reflection body may be constructed of at least two components, wherein a first component has the first surface which is at least partially transparent to the radiation emitted by the source of energy and which has a second structured surface on the side facing away from the first surface. At least a portion of the second component is capable of reflecting the radiation, and this second component abuts against the first component at least in sections.

20 Claims, 2 Drawing Sheets

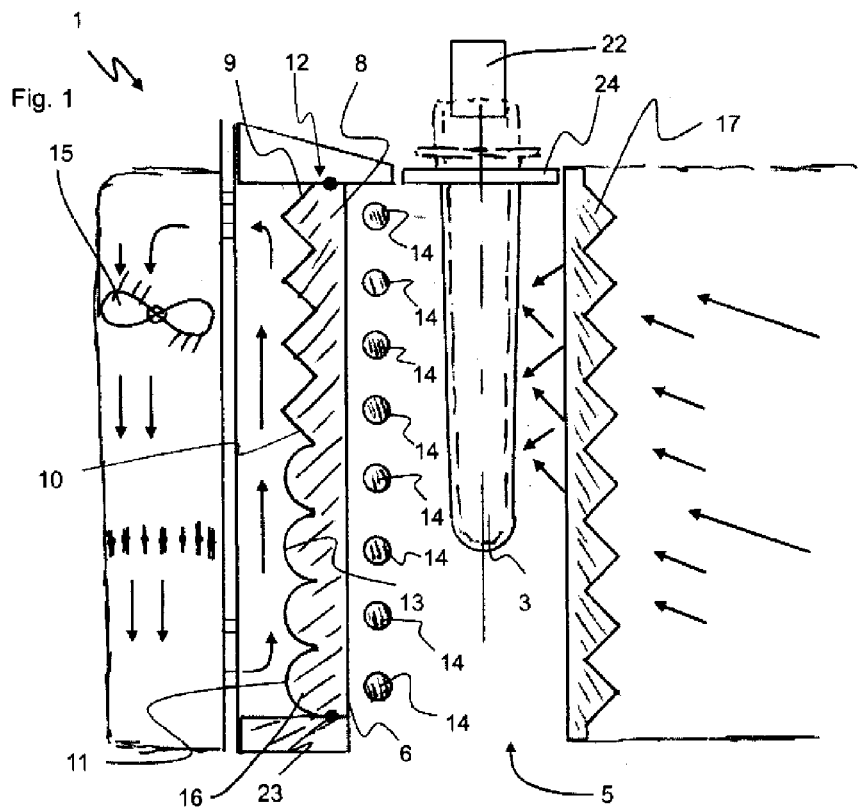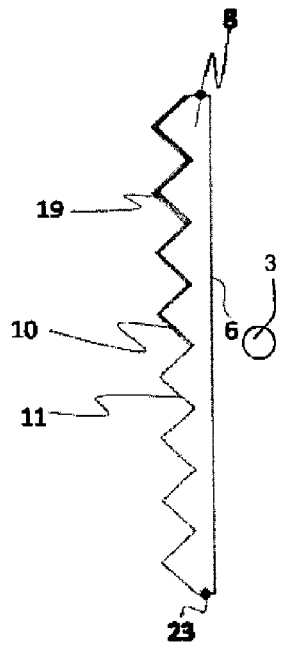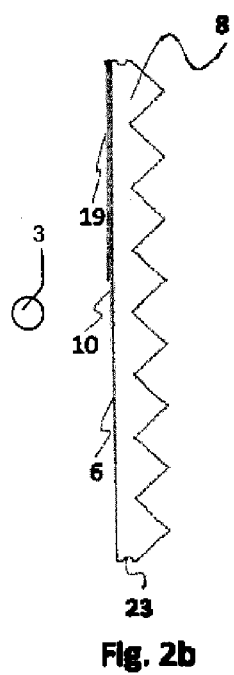
Fig. 1
Fig. 2a
Fig. 2b

APPARATUS FOR HEATING PLASTIC PREFORMS

CROSS-REFERENCE TO RELATED APPLICATION

This application claims the benefit of priority of German Patent Application No. 10 2009 008 318.9, filed Feb. 10, 2009, pursuant to 35 U.S.C. 119(a)-(d), the disclosure of which is incorporated herein by reference in its entirety as if fully set forth herein.

TECHNICAL FIELD

The present disclosure relates to an apparatus for heating articles made of metal, glass, composite material, plastic or a combination of these materials and, in particular, to an apparatus for heating plastic preforms for producing containers. It is pointed out that the disclosure may also be applied to other kinds of preforms. It is further pointed out that the disclosure may be applied to heating sections in the heating modules of stretch blow moulding machines, coatings on metallic materials, in particular, in the case of coated sheet metal, and reflectors in the heating sections of stretch blow moulding machines, as well as on all further apparatuses for heating or sterilising plastics by means of infrared (IR) radiators.

BACKGROUND

Reflectors in stoves/heating boxes of stretch blow moulding machines are known, wherein a reflector material made of ceramic materials is used. From WO 2006/002751 A1, a heating stove for preforms is known. This heating stove includes means for receiving and transporting the preforms through the apparatus. Further, a counter reflector for the radiation source is provided which is profiled on the surface that faces the preform. Whilst on the one hand, an improved heat input into the preforms is achieved by means of this profiling, on the other hand, however, this surface is relatively hard to clean and therefore performance losses may result in the course of time due to contamination and oxidisation.

In DE 197 24 621 B4, a method and an apparatus for heating preforms are described. The preforms are moved herein past radiant heaters and the radiant heaters are acted upon by focusing elements, wherein the heating radiation is reflected by a primary mirror onto a secondary mirror. Whilst this procedure also allows an improved input of heat into the preforms, however, the apparatus is relatively hard to clean.

One problem with the apparatuses known from the prior art is the high energy demand resulting from the heating of plastic preforms.

It may therefore be desirable to provide methods and apparatuses for heating preforms with substantially improved efficiency and thus energy savings.

SUMMARY OF INVENTION

In accordance with various aspects of the disclosure, an apparatus for heating at least one plastic preform for producing containers may include a reflection body, a source of energy for emitting heat radiation for heating the plastic preform, and holding means for holding the plastic preform. The holding means can be moved relative to the reflection body, the reflection body may have a first surface allocated to the plastic preform, and the source of energy may be disposed in such a way that its radiation reaches the reflection body.

According to the disclosure, the reflection body may be constructed from at least two components, wherein a first component has the first surface and is at least partially transparent to the radiation emitted by the source of energy, and has a second structured surface on a side which faces away from, for example, in a direction opposite to, the first surface. At least a portion of the second component is capable of reflecting the radiation, and this second component abuts against the first component at least in sections.

The holding means may comprise, for example, a mandrel which projects into a mouth of the preform in order to hold it. However, it would also be conceivable to use gripping clamps as the holding means.

In some aspects, the first and/or the second surface(s) of the first component is/are designed to be structured. In some aspects, the first surface may be formed to be smooth. By this procedure according to the disclosure, it is achieved that on the one hand the surface facing the preforms is easy to clean, on the other hand, however, also the advantages of a structured surface with regard to reflection and focusing effects may be achieved.

The second component either abuts against the first or against the second surface of the first component, i.e. the second component is structurally adapted to the first and/or the second surface(s) of the first component at least in sections.

The apparatus herein is at least in part a stove or a heating box, by means of which the preforms comprising plastic, for example, PET, PS, PC etc., are heated in order to be subsequently further processed into containers or bottles.

A smooth surface is here understood to mean, for example, a planar surface. Such surfaces may be cylinder shaped, flat, or conical in shape and will, in some aspects, have a mean roughness of less than 10 µm, in some aspects, less than 2 µm, in some aspects, less than 0.5 µm, in some aspects, less than 0.1 µm and, in some aspects, less than 0.02 µm.

In a further exemplary embodiment of the present disclosure, the second component has a coating, the material of which is selected from a group of materials including aluminium, chromium, nickel, copper, gold, and/or at least one alloy made from at least one of these metals. The above-mentioned materials or alloys may have desirable high reflection properties. It is further conceivable that the second component comprises a solid body rather than a coating, the structure of which may be adapted to the structure of the first component and may therefore abut against the latter. It is further conceivable that this solid body has polished surface areas, as a result of which the reflection effect may be even further enhanced. The second component may further include a solid body or a coating, the material of which is a ceramic material or which includes a combination of several ceramic materials and/or the material of which is a plastic material or includes a combination of several plastics. As ceramic materials, for example, silicate ceramics, oxidic ceramics such as for example aluminium oxide, beryllium oxide, or non-acidic ceramics such as for example silicon carbide, boron nitride, boron carbide and others may be used here. As plastics, for example, polyethylene, polypropylene, polyvinyl chloride, polystyrene, polyurethane, or polyethylene terephthalate may be used.

In a further exemplary embodiment of the present disclosure, the second component may be cooled by means of a cooling device. This may be desirable because in this way any overheating of the apparatus and of the components downstream thereof may be counteracted.

In a further exemplary embodiment of the present disclosure, the cooling device provides fluids such as for example oil or a protective gas ($CO_2$) for cooling the second component. This may be desirable since these fluids may be used to dissipate heat from the apparatus in a simplified manner, and by means of these fluids the second component may be protected from oxidisation and contamination.

In a further exemplary embodiment of the present disclosure, the first component is made of glass, for example, quartz glass, or includes glass or quartz glass and may be formed as at least one sheet, moulded glass, or several glass segments. In this connection it is possible that the glass may also be manufactured from other glass-like glass variants or glass variants based on different basic configurations. It is further to be noted that the glass segments, the sheet, and the moulded glass may be implemented in different forms, i.e. depending on the respective application. This has the advantage that there are possibilities for using the apparatus according to the present disclosure in the most varied areas of application.

In a further preferred embodiment of the present invention, the structured surface of the first component is prism- and/or parabola-shaped at least in a horizontal and/or a vertical and/or a diagonal position. This has the advantage that, as required, any combination of prisms and/or parabolas may be provided in any desired orientation and position. It is also conceivable that the structured surface of the first component may also be implemented with prongs and edges, i.e. partially also with flat sections.

The structured surface may enhance the area across which the heat may be dissipated from the reflection body.

In a further exemplary embodiment of the present disclosure, the source of energy is at least one IR radiator, which may be capable of emitting thermal energy in a targeted way by thermal radiation. The metallic and ceramic materials mentioned above or below, as well as the plastic materials mentioned, may be used either individually or in combination as a material for the radiant heater or components thereof.

In a further exemplary embodiment of the present disclosure, the at least one infrared radiator is placed between the first component and the plastic preform and may be implemented as a tube or the like. This results in the preform being exposed to infrared radiation, which may be emitted directly from the infrared radiator, and in addition to infrared rays reflected from the second component. In this connection it is further conceivable that the infrared radiator is located at the same distance from the first component as the preform.

Further, by means of the heat radiation, a good heat penetration throughout the preform may be achieved, which means that the internal temperature and the external temperature thereof are very close to each other.

In a further exemplary embodiment of the present disclosure, a further reflection body is provided. This further reflection body may be formed in correspondence with the first reflection body, so that production costs may be reduced as a result of parts being identical. It is however also possible to adapt in any desired way all of the previously intended properties of the reflection body such as for example the structure, the compositions, the surface properties, and the shape of the components used. The preforms may be guided between the first reflection body and the second reflection body. For example, the two reflection bodies may be each located here at essentially the same distance from the preforms.

In a further exemplary embodiment of the present disclosure, the second component is opaque to long-waved radiation such as, for example, infrared radiation such that infrared rays are reflected.

In a further exemplary embodiment of the present disclosure, at least one further holding means for holding preforms is provided. Accordingly, several preforms may be introduced into the apparatus or guided through the apparatus at the same time or in an overlapping manner or in a successive manner, so that the production process may be accelerated.

In some aspects, a plurality of holding means may be provided. For example, a transport device may be provided which transports the preforms, and on this transport device a plurality of holding means may be disposed. Thus, the transport device may, for example, be a transport chain having disposed thereon a plurality of holding means such as for example in the form of holding mandrels.

In a further exemplary embodiment of the present disclosure, a transport device for moving the holding means is provided. The transport device and thus the position of the preforms may be controlled by means of a control unit in such a way that the heating process may be optimised with regard to heating and flow rate.

The present disclosure further relates to the use of an apparatus of the above described type for heating plastic preforms for producing containers.

The present disclosure is further directed to a system for producing plastic containers, which includes an apparatus of the above-mentioned kind as well as a moulding device for moulding the plastic preforms into plastic containers, which is disposed downstream of the apparatus in the transport direction of the preforms. This moulding device may, for example, be a blow moulding machine and, in some aspects, a stretch blow moulding machine.

Some further advantages and embodiments may become evident from the attached drawings.

BRIEF DESCRIPTION OF THE DRAWINGS

In the drawings:

FIG. 1 shows a lateral view of an exemplary apparatus for heating preforms according to various aspects of the disclosure;

FIG. 2a shows an exemplary reflection body according to various aspects of the disclosure, with the second component being disposed on the structured surface of the first component;

FIG. 2b shows an exemplary reflection body according to various aspects of the disclosure, with the second component being disposed on the smooth surface of the first component;

DETAILED DESCRIPTION

Figure 3A:
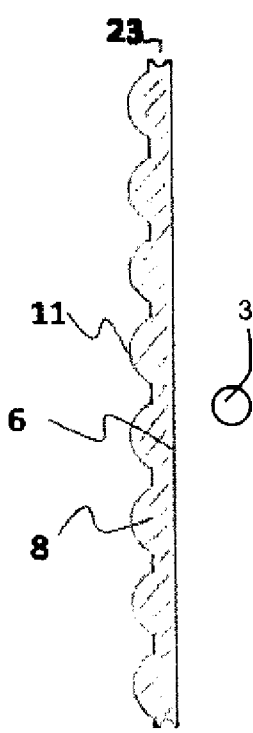
FIG. 3a shows an exemplary embodiment of the first component (cast glass) in accordance with various aspects of the disclosure.

FIG. 1 illustrates an apparatus 1 for heating plastic preforms in accordance with various aspects of the disclosure. The apparatus 1 may include a cooling device 15 which dissipates, by means of circulating at least one fluid, heat from the apparatus, in particular from the first or second component 10. Fluids that may be used to this end may be known protective gases, in particular $CO_2$, but also air and other gas mixtures or gases. It is further conceivable that also liquids such as oil, coolant or water are used, which may be appropriately diluted with additives in accordance with the respective boundary conditions.

By using suitable fluids, any oxidisation or contamination of the critical surfaces, such as the first component 8 and/or the second component 10, may be avoided or reduced, as a result of which the reflection properties of the apparatus 1 or of the reflection body 12 may be maintained. In the embodiment illustrated in FIG. 1, no further component in the form of a coating or a solid body is disposed between the second component 10 and the fluid, however, this would also be conceivable. It is further conceivable to dispose the second component 10 on the second surface 11 of the first component 8 and to dispose a further component next to this. The further component may here be a coating.

The second component 10 may comprise a solid body and/or a coating. The coating may comprise, for example, a material selected from a group of materials including aluminium, chromium, nickel, copper, gold, and/or at least one alloy made from at least one of these metals. The abovementioned materials or alloys may have desirable high reflection properties. The second component 10 may comprise a solid body having a structure adapted to the structure of the first component 8 and may therefore abut against the latter. It is further conceivable that this solid body has polished surface areas, as a result of which the reflection effect may be even further enhanced. The second component 10 may further include a solid body or a coating, the material of which is a ceramic material or which includes a combination of several ceramic materials and/or the material of which is a plastic material or includes a combination of several plastics. As ceramic materials, for example, silicate ceramics, oxidic ceramics such as for example aluminium oxide, beryllium oxide, or non-acidic ceramics such as for example silicon carbide, boron nitride, boron carbide and others may be used here. As plastics, for example, polyethylene, polypropylene, polyvinyl chloride, polystyrene, polyurethane, or polyethylene terephthalate may be used.

The reflection body 12 has a first component 8 and a second component 10 and is formed to be smooth on the side facing the infrared radiators 14. On the side facing away from the infrared radiators 14, the first component 8 is structured. The structure has here, for example, the form of prongs in a first area 9 of the apparatus and, for example, that of a parabola in a second area 13. In this connection it is to be noted that on the one hand further form variants such as for example prism-shaped portions of the structure may be provided in such a combination. A combination of at least two different structure portions may be provided here by differently sized structural components of a single form, but also by a plurality of different structures, which are successively arranged in any desired way or which merge into each other. It is further conceivable that also structural elements are provided which are disposed and implemented parallel to the smooth surface areas of the first component 8, i.e. which are implemented in a flat or smooth manner. In some aspects, however, a uniform structure is used.

The IR radiators 14 are disposed between the reflection body 12 and the predetermined position of the preform 3 in such a way that they irradiate the preform 3 on the one hand directly and on the other hand irradiate the preform 3 indirectly via the reflection body 12.

The reference numeral 22 relates to a holding member for the preforms which, as is known in the prior art, may be implemented as a mandrel which projects into the mouth of the containers. In the embodiment shown in FIG. 1, the holding member 22 is shaped in such a way that by means of form closure a preform 3 is introduced into the processing area or the heating area 5.

A plate-shaped shield 24 may also serve as a heat shield plate, so that the transfer of heat out of the processing area is reduced. Further, owing to the heat shield plate or shield 24, no heating of the preform head, i.e. of the thread area, takes place. In some aspects, the shielding may be arranged to be stationary.

Further, one or more additional reflection bodies 17 may be provided, for which the same embodiment conditions apply as for the first reflection body 12. However, it is to be pointed out that the first reflection body 12 and the further reflection body 17 do not need to be implemented in an identical manner. If more reflection bodies 12, 17 are provided, it would be conceivable that the IR radiators 14 are disposed in a staggered manner. The heat input may be controlled by means of any desired arrangement of the IR radiators 14 in such a way that, depending on the application, a uniform or non-uniform heating of the preform 3 may be achieved. The control is carried out here via a control unit (not shown), by means of which the temperature or heat emission of each or all of the IR radiators 14 may be controlled and which allows the movement of the holder 22 to be controlled.

FIG. 2a shows a reflection body 12, the first surface 6 of which is implemented to be smooth and the second surface 11 of which is implemented to be structured. The structuring here is formed to be uniform and jagged. On the second surface 11 of the reflection body 12, a second component 10 is disposed, and on the second component 10, a further component 19 is attached which protects the second component 10 from oxidisation and/or contamination. For illustration, the reference numeral 3 identifies here too a container or a plastic preform.

It can be seen from FIG. 2b that on the first surface 6 of the first component 8, initially a second component 10 is brought into contact with the first component 8 at least in sections. It can further be seen that a further component 19 is brought into contact with the second component 10. The structures of the surfaces of the individual components are adapted to each other. The further component 19 is implemented here as a protective coating which protects the second component 10 from oxidisation and contamination. The reference numeral 23 identifies means for fixing the reflection body 12, 17 in the apparatus 1. It is further to be noted that between the first and the second components 8, 10 and on the further component 19, further coatings may be deposited, as long as the reflection properties of the respective reflection bodies 12, 17 are not negatively affected.

In FIG. 3a, the first component 8 is made from cast glass and has a first smooth surface 6 and a second structured surface 11. The second surface 11 is identified by parabolic elevations which are connected to each other at a distance of at least 1 mm by a connection piece implemented essentially parallel to the smooth surface 6. In the variant illustrated, this connection piece is implemented to be flat. On the surface 11 on the other hand, a reflective coating or, as shown, another reflective body may be provided.

Figure 3B:
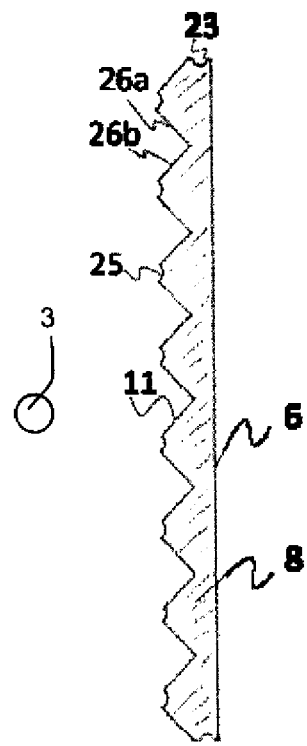
FIG. 3b shows an exemplary embodiment of the first component (milled glass) in accordance with various aspects of the disclosure.

FIG. 3b shows a further first component 8 made from milled glass. Here again, a first smooth surface 6 and a second structured surface 11 are provided. The structured surface 11 includes prongs, the flanks of which, i.e. a flank 26a of a first prong and a further flank 26b of a second prong, which is inclined relative thereto, are orientated at an angle of at least 70°, in some aspects at least 75°, and in some aspects at least 80°, relative to each other. The tips of the prongs are rounded. In this connection, curvatures having a radius of 2.5-6 mm may be desirable.

Figure 4A:
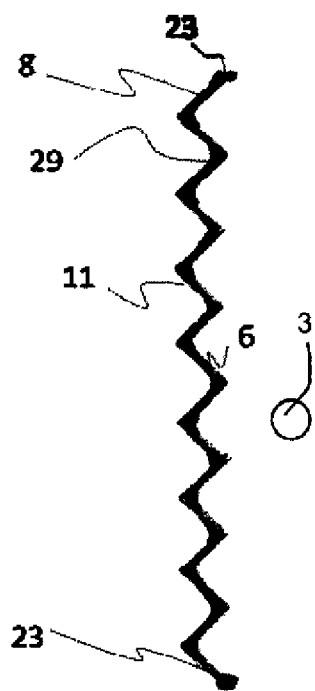
FIG. 4a shows an exemplary embodiment of the first component as moulded glass in accordance with various aspects of the disclosure.

FIG. 4a shows a first component 8 which is made from moulded glass. The first component 8 has here a first structured surface 6 and a second structured surface 11. Both surfaces 6, 11 are formed to be jagged and have rounded curves in the valleys 29. As is the case in the embodiment variants described above, it is possible here to dispose the second component 10 on the first surface 6 or the second surface 11. On the second component 10, on the other hand, a further component 19 may be disposed, if required.

Figure 4B:
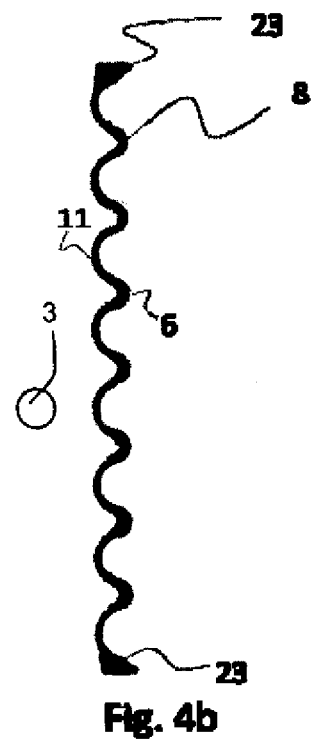
FIG. 4b shows an exemplary embodiment of the first component as moulded glass in accordance with various aspects of the disclosure.

In correspondence with the embodiment shown in FIG. 4a, FIG. 4b shows again a first component 8 in the form of moulded glass. As opposed to the illustration shown in FIG. 4a, the illustration shown in FIG. 4b has no prongs, but only rounded curves. The curves may here have the same radius, but it is also possible that, as shown, different radii are provided.

It will be apparent to those skilled in the art that various modifications and variations can be made to the apparatuses and methods for reducing wear on control cams of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An apparatus for heating at least one plastic preform for producing containers, the apparatus comprising:
    a reflection body;
    a source of energy for emitting thermal energy for heating the plastic preform; and
    a holding member structured and arranged to hold the plastic preform, wherein the holding means may be moved relative to the reflection body,
    wherein the reflection body has a first surface facing the plastic preform, and the source of energy is disposed in such a way that the radiation thereof reaches the reflection body, wherein the reflection body is constructed from at least two components, wherein a first component has a first surface and is at least partially transparent to radiation emitted by the source of energy, and has on a side facing away from the first surface a second structured surface, and wherein at least a portion of the second component is capable of reflecting the radiation and said second component abuts against the first component at least in sections.

2. The apparatus as claimed in claim 1, wherein the second component has a coating, the material of which is selected from a group of materials including aluminium, chromium, nickel, copper, gold, and at least one alloy including at least one of these metals and/or the material of which is a ceramic material or a combination of several ceramic materials and/or the material of which is a plastic or a combination of several plastics.

3. The apparatus as claimed in claim 1, further comprising a cooling device configured to cool the second component.

4. The apparatus as claimed in claim 3, wherein the cooling device provides one of a fluid and a protective gas for cooling the second component.

5. The apparatus as claimed in claim 1, wherein the first component comprises glass.

6. The apparatus as claimed in claim 5, wherein the glass comprises quartz glass.

7. The apparatus as claimed in claim 5, wherein the glass is formed as one of at least one sheet, moulded glass, and several glass segments.

8. The apparatus as claimed in claim 1, wherein the structured surface of the first component is at least one of prism-shaped and parabola-shaped in at least one of a horizontal position, a vertical position, and a diagonal position.

9. The apparatus as claimed in claim 1, wherein the source of energy comprises at least one infrared radiator.

10. The apparatus as claimed in claim 9, wherein the at least one infrared radiator is disposed between the first component and the plastic preform.

11. The apparatus as claimed in claim 1, further comprising an additional reflection body.

12. The apparatus as claimed in claim 1, wherein the second component is opaque to long-waved radiation.

13. The apparatus as claimed in claim 1, further comprising at least one additional holding member for holding preforms.

14. The apparatus as claimed in claim 1, further comprising a transport device for moving the holding member.

15. A method of heating plastic preforms for producing containers, the method comprising:
    moving a preform to the apparatus of claim 1 such that the preform is positioned proximate the source of energy and the first component; and
    operating the source of energy to emit thermal energy for heating the plastic preform.

16. An apparatus for heating at least one plastic preform for producing containers, the apparatus comprising:
    a holding member structured and arranged to hold a plastic preform;
    a source of energy for emitting thermal energy for heating a plastic preform; and
    a reflection body, the reflection body having a first surface structured and arranged to face a plastic preform being held by the holding member, the source of energy being configured such that radiation emitted from the source of energy reaches the reflection body, the reflection body comprising
        a first component including said first surface and a second structured surface facing a direction away from the first surface, said first component being at least partially transparent to radiation emitted by the source of energy, and
        a second component abutting at least a portion of the second structured surface, said portion of the second component being capable of reflecting radiation from said source of energy.

17. The apparatus of claim 16, wherein the second component comprises at least one of a solid body and a coating.

18. The apparatus of claim 16, wherein the second component comprises at least one of a material selected from a group of materials including aluminium, chromium, nickel, copper, gold, and at least one alloy including at least one of these metals, a material including at least one ceramic material, and a material including at least one plastic.

19. The apparatus of claim 16, wherein the first component comprises glass, the second component is opaque to long-waved radiation, and the source of energy comprises at least one infrared radiator.

20. The apparatus of claim 16, further comprising a cooling device configured to cool the second component.

* * * * *